(12) United States Patent
Luthra et al.

(10) Patent No.: US 9,036,700 B2
(45) Date of Patent: May 19, 2015

(54) SIMULCAST OF STEREOVIEWS FOR 3D TV (75) Inventors: Ajay K. Luthra, San Diego, CA (US);
Mandayam A. Narasimhan, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 806 days.

(21) Appl. No.: 12/835,103

(22) Filed: Jul. 13, 2010

(65) Prior Publication Data
US 2011/0012992 A1 Jan. 20, 2011

Related U.S. Application Data (60) Provisional application No. 61/225,792, filed on Jul. 15, 2009.

(51) Int. Cl.
H04N 13/00 (2006.01)
H04N 19/597 (2014.01)

(52) U.S. Cl.
CPC ......... *H04N 13/0048* (2013.01); *H04N 19/597* (2014.11)

(58) Field of Classification Search
None
See application file for complete search history.

(56) References Cited

U.S. PATENT DOCUMENTS

| 4,802,005 | A * | 1/1989 | Kondo | 375/240.12 |
| 6,704,042 | B2 * | 3/2004 | Matsui et al. | 348/43 |
| 7,929,560 | B2 | 4/2011 | Morioka | |
| 2002/0009137 | A1 | 1/2002 | Nelson et al. | |
| 2003/0067637 | A1* | 4/2003 | Hannuksela | 358/504 |
| 2005/0220192 | A1 | 10/2005 | Huang et al. | |
| 2006/0221178 | A1 | 10/2006 | Yun et al. | |
| 2007/0041444 | A1 | 2/2007 | Gutierrez Novelo | |
| 2007/0211796 | A1* | 9/2007 | Kim | 375/240.01 |
| 2008/0317124 | A1 | 12/2008 | Cho et al. | |
| 2009/0288125 | A1* | 11/2009 | Morioka | 725/110 |
| 2010/0110163 | A1* | 5/2010 | Bruls et al. | 348/43 |
| 2011/0001792 | A1* | 1/2011 | Pandit et al. | 348/43 |
| 2011/0286530 | A1* | 11/2011 | Tian et al. | 375/240.25 |

FOREIGN PATENT DOCUMENTS

WO 0197531 A2 12/2001
WO 2009040701 A2 4/2009

OTHER PUBLICATIONS

PCT Search Report & Written Opinion, RE: Application #PCT/US10/42072; Nov. 1, 2010.
The State Intellectual Property Office of the People's Republic of China, Notification of the First Office Action, Nov. 25, 2013, all pages.
European Patent Office "Extend European Search Report" for Patent Application No. 10800518.2 dated Jan. 7, 2013, 9 pages.

* cited by examiner

*Primary Examiner* — Sath V Perungavoor
*Assistant Examiner* — Kate Luo (57) ABSTRACT

A three-dimensional (3D) video encoder includes a first encoder, a second encoder, and a multiplexer. The first encoder is configured to encode a base view to form a first independently compressed video stream associated with video content. The second encoder is configured to encode a nonbase view to form a second independently compressed video stream associated with the video content. The multiplexer is configured to multiplex the first and second independently compressed video streams associated with the video content to form a transport stream. The transport stream is operable to be processed to render a 3D video using the base and nonbase views.

21 Claims, 7 Drawing Sheets

SIMULCAST OF STEREOVIEWS FOR 3D TV

CLAIM OF PRIORITY

The present application claims the benefit of priority to U.S. Provisional Patent Application Ser. No. 61/225,792, filed on Jul. 15, 2009, entitled "Simulcast of Stereoviews For 3D TV", the disclosure of which is hereby incorporated by reference in its entirety.

BACKGROUND

Depth perception for a three dimensional (3D) TV is provided by capturing two views, one for the left eye and other for the right eye. These two views are compressed and sent over various networks or stored on storage media. A decoder decodes the two views and sends the decoded video to the 3D TV for display. The two views are known to be either merged into a single video frame or kept separate. When kept separate, the two views are known to be compressed and distributed using various methods. Two of these methods are multi-view coding (MVC) method and simulcast method. In the MVC method, the two views are compressed such that a correlation between the two views is exploited to increase coding efficiency. In the simulcast method, the two views are known to be compressed and distributed as two independent video streams.

MPEG standards (such as advanced video coding (AVC) or H.264 MPEG-4 and MPEG-2 systems) provide methods and syntax to represent and compress more than one view as well as to transport this compressed data in various ways. However, the current versions of the MPEG standards do not specify how to simulcast two views so that the two views can be decoded and combined appropriately to provide a 3D display. Consequently, simulcasting may not be currently done using MPEG standards for video systems and other types of systems.

Further, many broadcast centric standards (i.e. Society of Cable Telecommunications Engineers (SCTE) and Advanced Televisions Systems Committee (ATSC)) that are followed by a wide range of service providers and manufacturers do not allow sending two video components compressed with a same coding method within a same program or channel (i.e., two video components with the same "stream type" are not allowed in a program map table). This constraint precludes simulcasting of two video streams corresponding to the two eye views using a same compression standard in a same program. For example, the constraint precludes simulcasting two independent MPEG-2 or MPEG-4 streams (i.e. one for the left eye and one for the right eye for 3D TV) in the same program. Sending the two views in separate programs may be possible but adds complexity of requiring an additional tuner and time base synchronization between the two programs.

Furthermore, in many current proposals being discussed in MPEG and in the industry, both eye views are compressed using the same encoding standard. Because there are two dominant encoding standards, MPEG-2 and MPEG-4, this creates a backward compatibility problem for simulcast methods in digital TV systems that have mixture of MPEG-2 and MPEG-4 decoders. For instance, the MPEG-2 decoders will not be able to decode either view if the two views are compressed using the MPEG-4 standard.

SUMMARY

According to an embodiment, a three-dimensional (3D) video encoder includes a first encoder, a second encoder, and a multiplexer. The first encoder is configured to encode a base view to form a first independently compressed video stream associated with video content. The second encoder is configured to encode a nonbase view to form a second independently compressed video stream associated with the video content. The multiplexer is configured to multiplex the first and second independently compressed video streams associated with the video content to form a transport stream. The transport stream is operable to be processed to render a 3D video using the base and nonbase views.

According to another embodiment, a 3D video decoder includes an input module, a decoding module and a 3D combining module. The input module is configured to receive a transport stream. The transport stream includes first and second independently compressed video streams associated with the video content, included in a same broadcast program in the transport stream. The decoding module is configured to decode the transport stream to form base and nonbase views that are respectively from the first and second independently compressed video streams associated with the video content. The 3D combining module is configured to render a 3D video using the base and nonbase views.

According to another embodiment, a method of encoding a transport stream is disclosed. The method includes receiving video content. A base view is thereafter encoded to form a first independently compressed video stream associated with the video content. A nonbase view is encoded to form a second independently compressed video stream associated with the video content. The first and second independently compressed video streams associated with the video content are multiplexed to form a transport stream. The transport stream is operable to be processed to render a 3D video using the base and nonbase views.

According to another embodiment, a method of rendering a transport stream into 3D video is disclosed. The method includes receiving the transport stream, which includes first and second independently compressed video streams associated with the video content, included in a same broadcast program in the transport stream. The transport stream is then decoded to form base and nonbase views that are respectively formed from the first and second independently compressed video streams associated with the video content. A 3D video is thereafter rendered using the base and nonbase views.

Still in a further embodiment, a computer readable storage medium on which is embedded one or more computer programs implements the above-disclosed method of rendering a transport stream into 3D video.

Embodiments of the present invention include simulcasting independently compressed video streams in a same program for 3D TV distribution systems. The compressed video streams may have different standards, such as MPEG 2 and MPEG 4 to allow for backward compatibility. In another embodiment, the compressed video streams may have the same standards, such as both MPEG 4, to provide the highest resolution and quality 3D image in systems that have compatible decoders. Furthermore, in one embodiment, the independently compressed video streams are simulcasted in the same program by sending the streams as different types. By sending the streams in the same program rather than in two different programs, synchronization between the streams is much easier for generating the 3D video.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Figure 1:
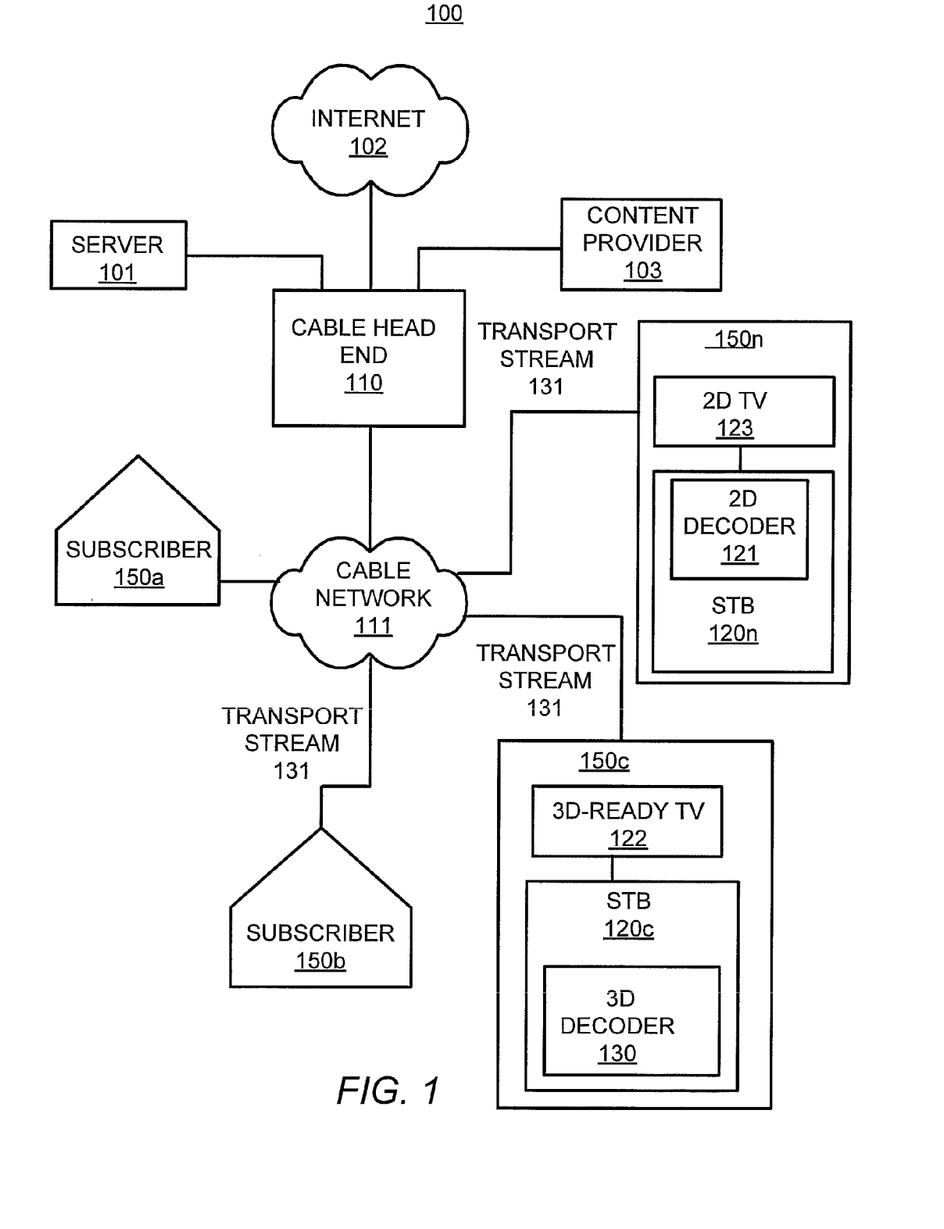
FIG. 1 illustrates a network architecture, according to an embodiment of the invention.

FIG. 1 illustrates a network architecture 100 of a system in which a 3D video decoder 130 may be used, according an embodiment. As shown in FIG. 1, the network architecture 100 is illustrated as a cable television (CATV) network architecture, including a cable head-end unit 110 and a cable network 111. A number of data sources 101, 102, 103, may be communicatively coupled to the cable head-end unit 110 including, but in no way limited to, a plurality of servers 101, the Internet 102, radio signals, or television signals received via a content provider 103. The cable head-end 110 is also communicatively coupled to one or more subscribers 150a-n through the cable network 111. It should be understood that the network architecture 100 depicted in FIG. 1 may include additional components and that some of the components described herein may be removed and/or modified without departing from a scope of the network architecture 100.

The cable head-end 110 is configured to output a transport stream 131. The transport stream 131 may be output to the set top boxes (STB) 120a-n using a satellite transmission, the Internet or other network using, for instance, fixed optical fibers or coaxial cables. The transport stream 131 is configured to provide cross standard compatibility for a mixture of 3D video decoders and 2D decoders 121 that may be used by the STBs 120a-n. Each of the subscribers 150a-n may receive the transport stream 131 at STBs 120a-n. The STBs 120a-n are devices that enable TVs to receive digital television (DTV) broadcasts. In one embodiment, the STBs 120a-n includes any device, not just conventional STBs that can perform the functions of the STBs 120a-n described herein.

The STBs 120a-n may be equipped with decoders with either 2D capability, as described with respect to the 2D decoder 121 or 3D capability. The STBs 120a-n may be connected to either a 2D TV 123 or a 3D-ready TV 122. In order to receive and display 3D video, the STB with 3D capability may be connected to a 3D-ready TV 122.

It should be understood that the 3D video decoder 130 and an STB 120c in which it is located, may be used in other networks and that the cable network architecture 100 is shown for simplicity and illustrative purposes. The 3D video decoder 130 may be used in other architectures.

Figure 2:
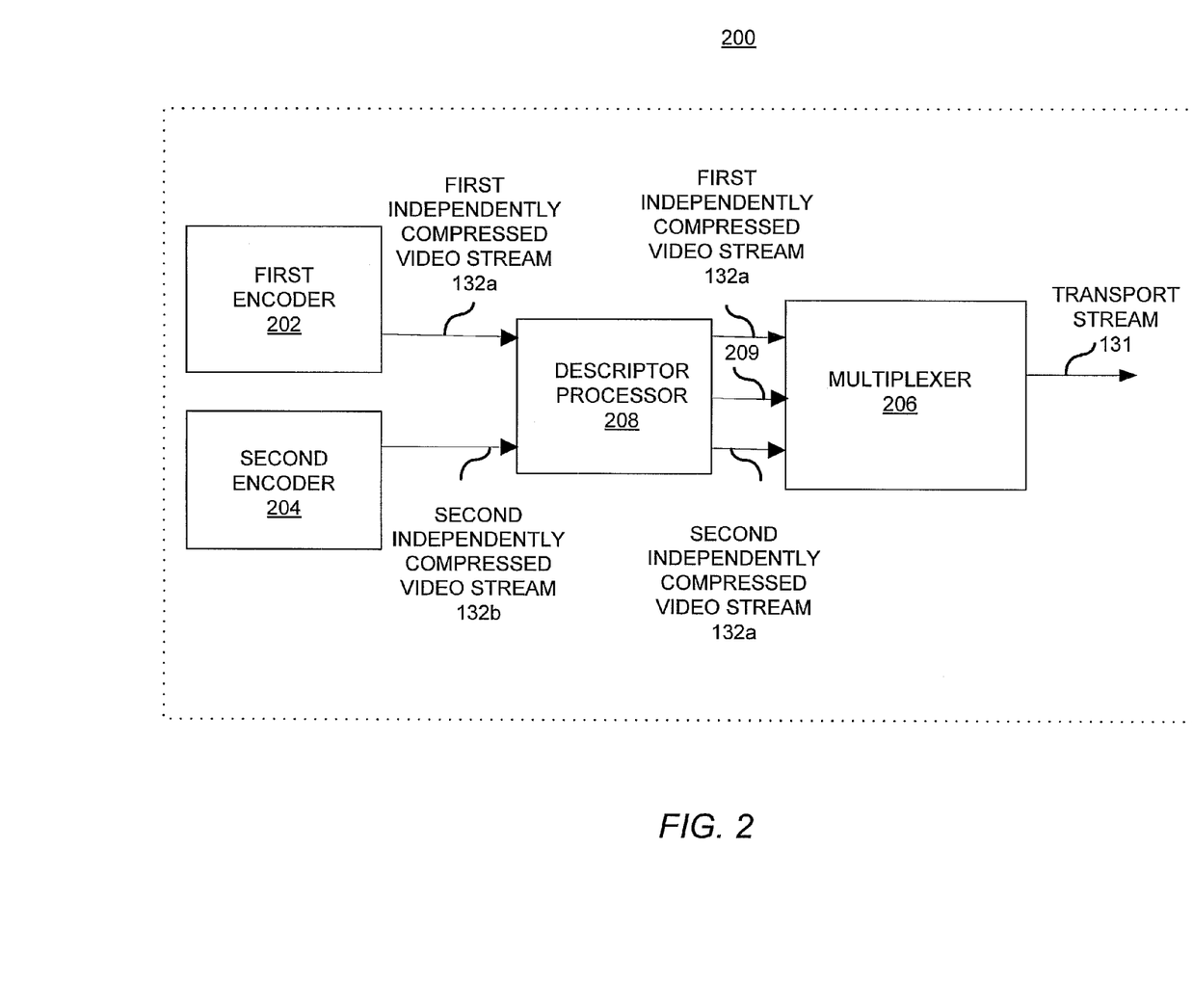
FIG. 2 illustrates a functional block diagram of multiplexing first and second independently compressed video streams associated with the video content to form a transport stream, according to an embodiment of the invention.

FIG. 2 illustrates a functional block diagram of a 3D video encoder 200. As shown in FIG. 2, the 3D video encoder 200 includes a first encoder 202, a second encoder 204, a descriptor processor 208 and a multiplexer 206. It should be understood that the 3D video encoder 200 depicted in FIG. 2 may include additional components and that some of the components described herein may be removed and/or modified without departing from a scope of the 3D video encoder 200.

The first encoder 202 is configured to compress a base view to form a first independently compressed video stream 132a associated with video content. A base view is an eye view for the 3D video that may be used as a full view in a two dimensional (2D) system. For instance, the base view may comprise a left eye view in a 3D video system and the full view in a 2D video system. The video content may be received from, for instance, broadcast programs, Internet Protocol TV (IPTV), switched video (SDV), video on demand (VOD) or other video sources. The second encoder is configured to compress a nonbase view to form a second independently compressed video stream 132b associated with the video content. A nonbase view is used along with the base view to render the 3D video, as described hereinbelow, and may be dropped by 2D systems. The first and second independently compressed video streams 132a-b associated with the video content are not compressed with reference to other components, e.g. in contrast to MVC coded video components in which the components are coded with respect to each other. Example of video compression may include conventional MPEG standards. "MPEG," as used herein, refers to a group of standards for encoding and decoding transport streams as defined by the Moving Picture Experts Group. MPEG includes several formats for transport streams such as MPEG-2 and MPEG-4 part 10/H.264.

The descriptor processor 208 is configured to create and add an associated descriptor 209 to the first and second independently compressed video streams 132a-b. The descriptor processor 208 may receive information describing the first and second independently compressed video streams 132a-b from the first encoder 202 and the second encoder 204 respectively, and use this information in generating the descriptor 209. The descriptor 209 is configured to allow a decoder that receives the transport stream 131 to decode (including any adjustment of video resolutions) and render a 3D video from the decoded base and nonbase views and is included in both the first and second independently compressed video streams 132a-b.

The multiplexer 206 is configured to receive the first and second independently compressed video streams associated with the video content 132a-b from the first encoder 202 and the second encoder 204. The multiplexer 206 thereafter multiplexes the first and second independently compressed video streams 132a-b along with the associated descriptor 209 to form a transport stream 131. The transport stream 131 is a video stream that includes the first and second independently compressed video streams 132a-b. The independently compressed video streams 132a-b may be included in a same program in the transport stream 131. A same program may correspond, for instance, to a single channel in broadcasting. The transport stream 131 may comprise Internet Protocol (IP) packets or any packetization scheme configured to transmit the transport stream 131. For instance, the transport stream 131 may comprise an MPEG stream, IP packets or any suitable medium for transporting the 3D video from a source to an end user.

Note that the base view in the first compression format (e.g., for video component 132a) is a full resolution 2D compatible stream that may be received and decoded by a 2D decoder, for instance the 2D decoder 121 shown in FIG. 1 that receives the same transport stream 131. The nonbase view may be discarded by the 2D decoder 121, for instance a conventional 2D decoder. Accordingly, the transport stream 131 may be used to provide backwards compatibility in a network architecture having a mixture of STBs with conventional 2D decoders and STBs with 3D decoders the network architecture 100 with the conventional decoders while allowing 3D capability with the STB 120c.

According to an embodiment, the first independently compressed video stream 132a is configured in a first compression format, for instance MPEG-2. The second independently compressed video stream 132b is configured in a second compression format, which differs from the first compression format, for instance MPEG-4. When the two views are compressed using different coding standards (e.g. MPEG-2 and MPEG-4) the broadcast-centric constraints allow two video components with different stream_type values within same program (i.e., the existing stream_type values for MPEG-2 video (0x02) and MPEG-4 (0x1B) can be used).

According to another embodiment, the first and second independently compressed video streams 132a-b are configured in a common compression format, for instance both being MPEG-2 or both being MPEG-4. The second independently compressed video stream 132b may be at a lower resolution than the first independently compressed video stream 132a. The second independently compressed video stream 132b is assigned a new stream type that is different than the first independently compressed video stream 132a in the program map table for the transport stream 131. A program map table is used to describe each single program including elementary streams associated with the program. The stream type may be specified in the program map table. The new stream type for the nonbase view may be allocated by a transport system, for instance MPEG-2. The new stream type allocated by the MPEG-2 systems may be equal to 0x21 for MPEG-4 and equal to 0x22 for MPEG-2. Alternately, the new stream type may be determined using a next available stream type, for instance a next available 'reserved' stream type values in the MPEG-2 systems (International Organization for Standardization (ISO) 13818-1) stream type table.

The two views compressed independently may be sent (using the same compression standard such as MPEG-4) as part of the same broadcast program in the transport stream 131 if sent as two different stream types. The transport stream 131 also includes a descriptor 209 that provides information to assist in combining and rendering the two separately decoded images onto an appropriate display. The descriptor 209 provides information to assist in combining and rendering two separately decoded images from the base view and the nonbase view into a 3D image to be displayed at the 3D-ready TV 122. The descriptor 209 may specify that the independently compressed video stream is for a particular view. Thus, even though the steam type for the video stream may be reserved or some other stream type, the decoder, for instance the 3D decoder 130 in FIG. 1 hereinabove, can determine from the descriptor 209 that the stream is to be combined with another stream for the other view. The descriptor 209 may also include identification of view (e.g. left or right), upsampling rules in instances where view resolutions differ, information for combining the views (e.g. field interleaving or frame interleaving) and additional display related elements.

According to an embodiment, the descriptor 209 may be configured to provide information on use of single stream, combining and rendering two fields or two frames in a same video sequence and additional display related elements in instances in which the transport stream 131 is an MPEG-4 conformant stream. The single stream is used in contrast to two streams to carry the base and nonbase views.

According to an embodiment, the information provided in the descriptor 209 at a system level includes a 3D rendering information descriptor. The 3D rendering information descriptor includes a descriptor tag, a descriptor length and an instruction to render each picture in the 3D video. An example of the 3D rendering information descriptor in tabular form is the following:

TABLE 1

Example of 3D rendering information descriptor

| Syntax | No. Of bits | Mnemonic |
|---|---|---|
| 3D_rendering_info_descriptor( ) { | | |
|   descriptor_tag | 8 | uimsbf |
|   descriptor_length | 8 | uimsbf |
|   two_views_in_same_stream | 1 | bslbf |
|   if (two_views_in_same_stream) { | | |
|     field_pictures | 1 | uimsbf |
|     if (field_pictures) { | | |
|       { field_parity | j | uimsbf |
|         top_field_first_in_composition | k | bslbf |
|       } | | |
|       else {frame_order | l | bslbf |
|       } | | |
|       display_specific_info | m | bslbf |
|     } | | |
|   else { | | |
|     left_or_right_view | 1 | uimsbf |
|     up_sample_horizontal | n | bslbf |
|     up_sample_vertical | p | bslbf |
|     field_or_frame_interleaving | q | bslbf |
|     display_specific_info | m | bslbf |
|     } | | |
|   } | | |
| } | | |

As shown in Table 1, j, k, l, m, n, p, and q represent constants that specify the number of bits used by each associated element in the table. The 3D rendering information descriptor provides information such as field_parity, top_field_first_in_composition, frame_order and display_specific_info including left_or_right_view, up_sample_horizontal, up_sample_vertical and field_or_frame_interleaving. For instance, by determining the descriptor constant k, the decoder determines whether the 3D video is to be rendered top field first in composition. The display specific information may include resolution of the 3D video 222. The 3D rendering information descriptor may be used by a receiver, for instance the STB 120c, to render the received the transport stream 131 to form 3D video 222.

Figure 3:
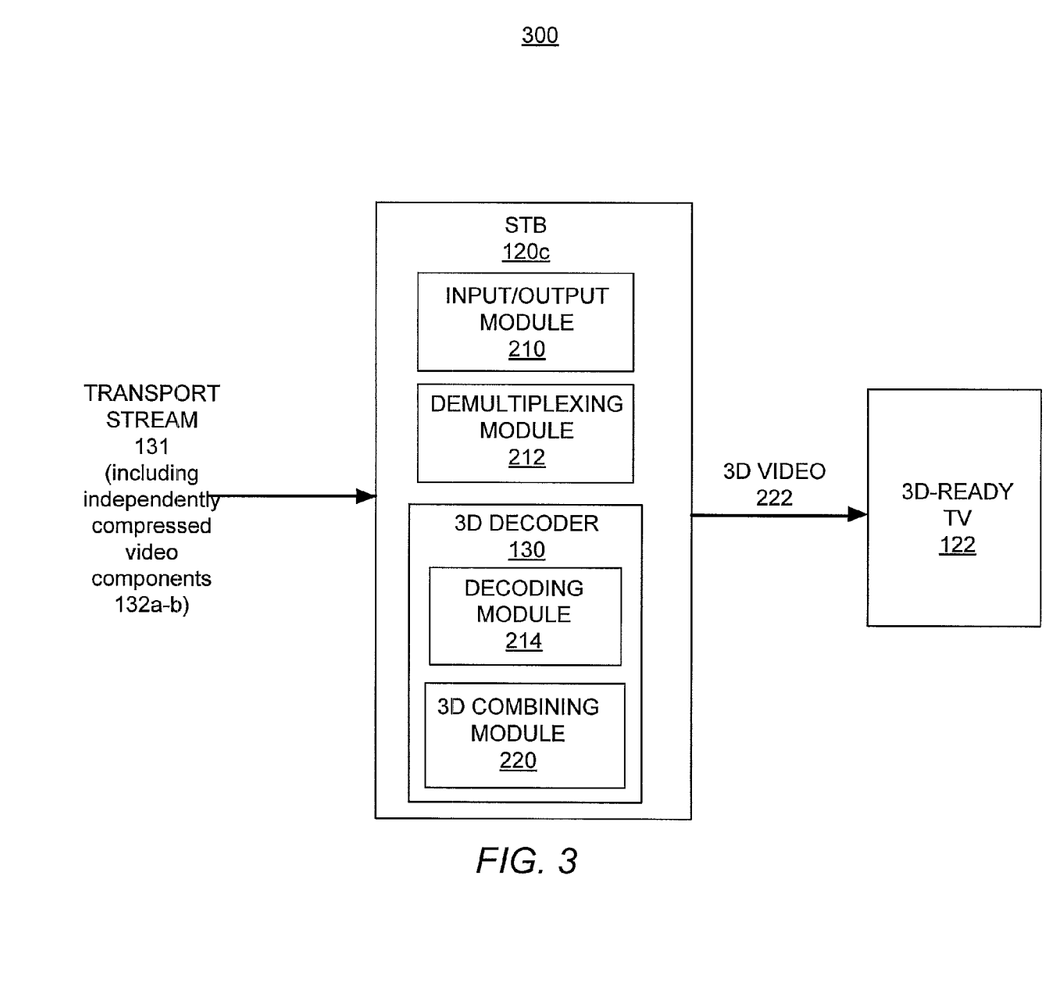
FIG. 3 illustrates a simplified block diagram of a 3D video decoder, according to an embodiment of the invention.

FIG. 3 illustrates a simplified block diagram of a system 300 configured to receive and display 3D content, according to an embodiment. The system 300 comprises the STB 120c, including the 3D decoder 130, and the 3D-ready TV 122 from FIG. 1. It should be understood that one or more of the modules of the system 300 may be provided in devices other than an STB, for instance a receiver. The STB 120c includes an input/output module 210, a demultiplexing module 212, and the 3D video encoder 130, which includes a 3D decoding module 214, and a 3D combining module 220. It should be understood that the system 300 depicted in FIG. 3 may include additional components and that some of the components described herein may be removed and/or modified without departing from a scope of the system 300.

The input/output module 210 is configured to receive the transport stream 131. The input/output module 210 may comprise a Universal Serial Bus (USB), an Ethernet interface, or another type of interface. The transport stream 131 received at the input/output module 210 in this instance may be a QAM modulated stream.

The demultiplexing module 212 may thereafter select a frequency and demodulate the frequency to obtain a multi program transport stream (MPTS). The demultiplexing module 212 is configured to demultiplex the MPTS to extract single program transport streams (SPTSs) corresponding to each of a plurality of programs which a subscriber may select. For instance, the subscriber 150n may use the STB 120 to select a program having 3D content. The demultiplexing module 212 then demultiplexes the MPTS to form the first and second independently compressed video streams associated with the video content 132a-b. Each of the first and second independently compressed video streams associated with the video content 132a-b has a different codec.

The 3D decoding module 214 is configured to decode the first and second independently compressed video streams 132a-b to form a base view (2D view) corresponding to a first eye view provided and a nonbase view corresponding to a second eye view. The base view and the nonbase view may be used by the STB 120c to render a 3D video 222 and output for display at the 3D-ready TV 122.

The 3D combining module 220 may be configured to access the 3D rendering information descriptor in the transport stream 131 and render the 3D video 222 using the instruction therein. After decoding of the first and second independently compressed video streams associated with the video content 132a-b by the decoding module 214, the base and nonbase views may be combined by the 3D combining module 220 to form a 3D video 222 that may be displayed on a 3D-ready TV 122 capable of displaying 3D (stereoscopic or multiple) views. The 3D combining module 220 may use a descriptor 209 included in the transport stream 131 in combining the base and nonbase views to render the 3D video 222. The descriptor 209 may include the supplemental enhancement information (SEI) to form a 3D video 222. The input/output module 210 is configured to thereafter output the 3D video 222, for instance to a 3D-ready TV.

The 3D combining module 220 may thereafter render pictures in the base view and the nonbase view according to information provided in the 3D rendering information descriptor. The 3D rendering information descriptor specifies operations to be performed to render the 3D video 222 from the transport stream 131. For instance, if two views are received in the same stream, the 3D combining module 220 may determine whether field pictures are received. Similarly, if field pictures are received in the base view, the 3D combining module 220 renders the 3D video 222 from the transport stream 131 according to the syntax in Table 1, hereinabove.

According to another embodiment, in instances in which the transport stream 131 is an MPEG-2 conformant stream, some of the rendering and combining information from the descriptor 209 may be included in the compressed video stream (such as picture user-data). This provides information on use of single stream, combining and rendering two fields or two frames in the same video sequence and additional display related elements.

According to another embodiment, the MPEG-4 video based rendering and combining information from the descriptor 209 includes an SEI message providing such information at a picture level or slice level in which values represent picture size, base view picture size, Sample Aspect Ratio (SAR), number of legs in the re-sampling poly-phase filter in the horizontal direction (Lh), number of filter coefficients (N) in each of those legs, number of legs in the re-sampling poly-phase filter in the vertical direction (Lv) and number of filter coefficients (M) in each of those legs. For picture size, a first predetermined value indicates that a picture size in the nonbase view is the same as a picture size in the base view. SAR is a ratio of width to height of a single pixel in an image in the 3D video. Lh is the number of legs in the re-sampling poly-phase filter in the horizontal direction. A value of '0' for Lh indicates to the 3D combining module 220 that horizontal re-sampling is not required and a value of '1' indicates to the 3D combining module 220 that horizontal lines are to be repeated for upsampling. A value greater than or equal to 2 indicates to the 3D combining module 220 of the coefficients (i,j), for i=0 to Lh−1, j=0 to N−1, of the poly-phase filter. Lv is the number of legs in the re-sampling poly-phase filter in the vertical direction. A value of '0' indicates to the 3D combining module 220 that vertical re-sampling is not required and a value of '1' indicates to that vertical lines are to be repeated for upsampling. For a value greater than or equal to 2 then the descriptor 209 provides the coefficients (i,j), for i=0 to Lv−1, j=0 to M−1, of the poly-phase filter.

According to another embodiment, the information in the MPEG-2 compressed video stream includes a user-data element providing information at the picture level. The values in the user-data element represent user-data type code, Length data, picture size, base view picture size, SAR, Lh, N, Lv and M. The user-data type code is set to a 4-byte value signaled by a registration descriptor. A value of '0' indicates to the 3D combining module 220 that picture size is the same as the base view for the nonbase view.

The components 210-220 may comprise software, hardware, or a combination of software and hardware. Thus, in one embodiment, one or more of the modules 210-220 comprise circuit components. In another embodiment, one or more of the modules 210-220 comprise software code stored on a computer readable storage medium, which is executable by a processor. It should be understood that the system 300 depicted in FIG. 3 may include additional components and that some of the components described herein may be removed and/or modified without departing from a scope of the system 300.

Figure 4:
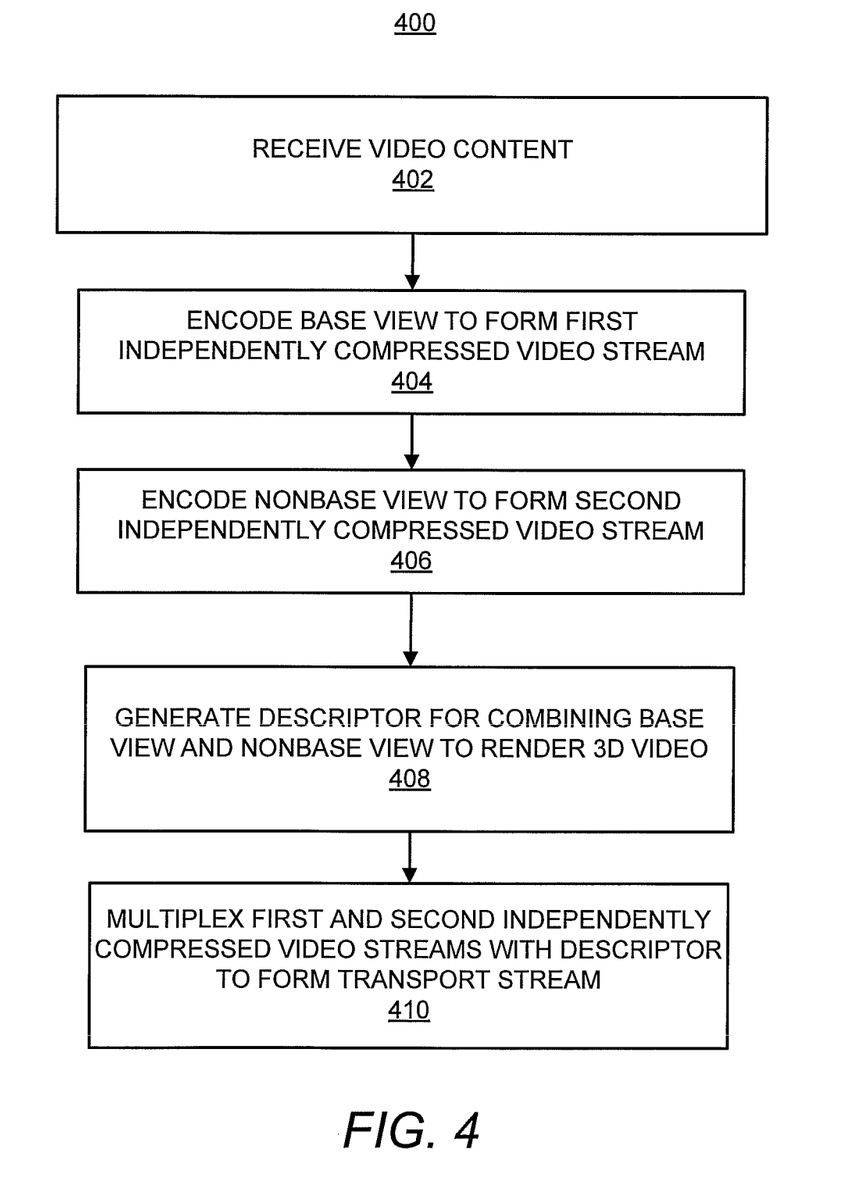
FIG. 4 illustrates a flow diagram of a method of encoding a transport stream, according to an embodiment of the invention.
Figure 5:
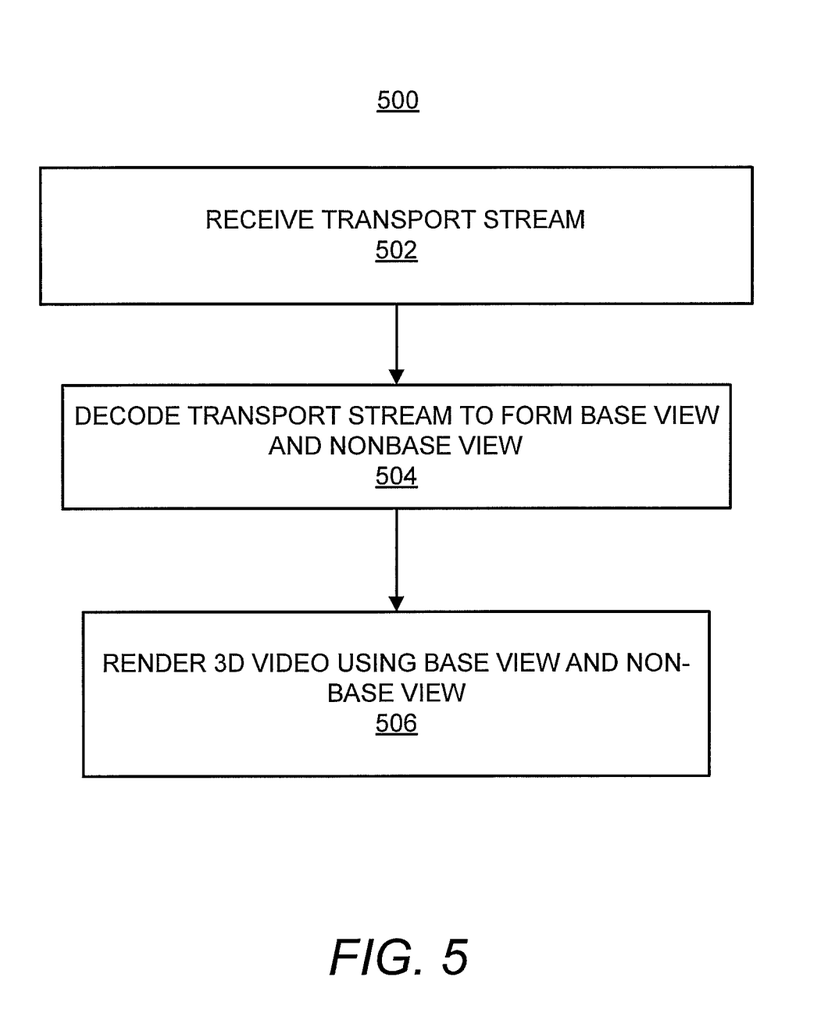
FIG. 5 illustrates a flow diagram of a method of rendering a transport stream into 3D video, according to an embodiment of the invention.
Figure 6:
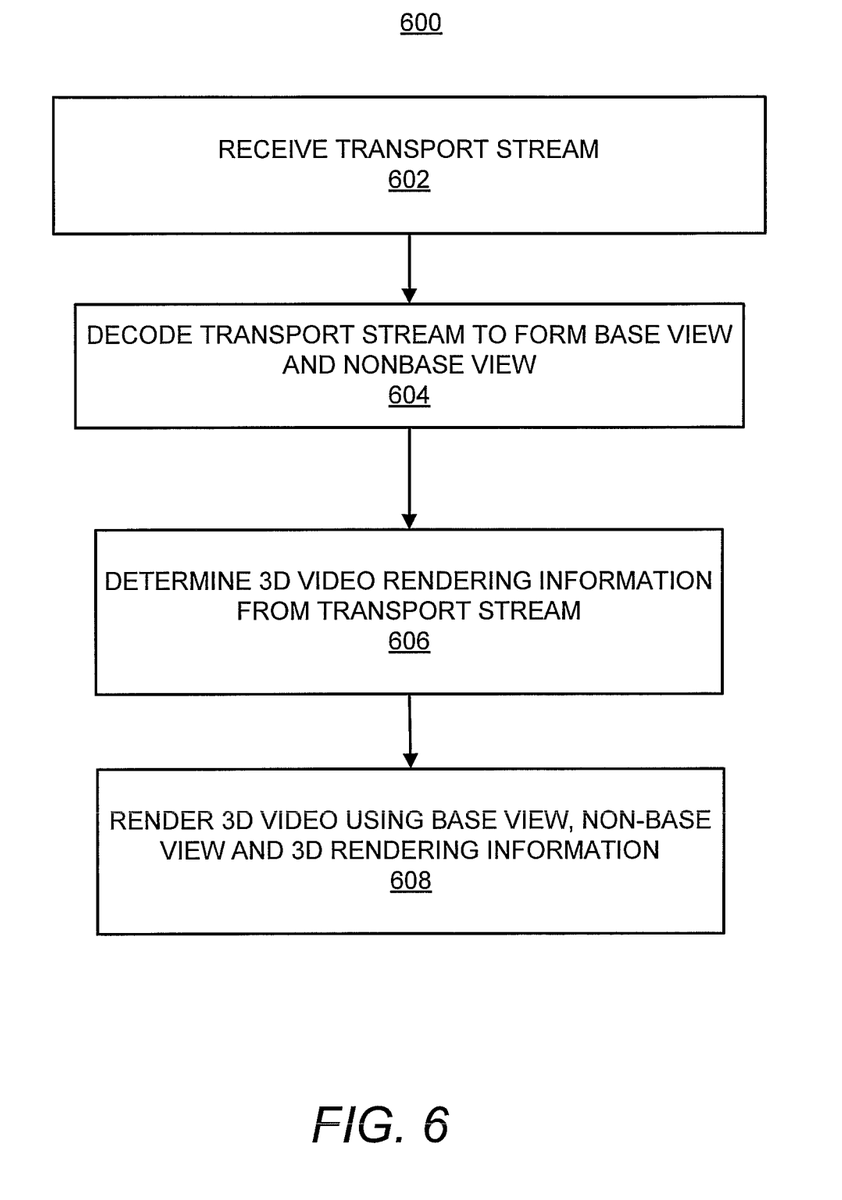
FIG. 6 illustrates a flow diagram of a method of rendering a transport stream into 3D video, according to an embodiment of the invention.

Examples of methods in which the 3D video encoder 200 and the decoder 300 may be employed for simulcast of stereoviews in 3D TV are now described with respect to the following flow diagrams of the methods 400-600 depicted in FIGS. 4-6. It should be apparent to those of ordinary skill in the art that the methods 400-600 represent generalized illustrations and that other steps may be added or existing steps may be removed, modified or rearranged without departing from the scopes of the methods 400-600. In addition, the methods 400-600 are described with respect to the 3D video encoder 200 and the decoder 300 by way of example and not limitation, and the methods 400-600 may be used in other systems.

Some or all of the operations set forth in the methods 400-600 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

FIG. 4, shows a method 400 of encoding a base view and a nonbase view to form a transport stream 131. The method 400 may be performed by the 3D video encoder 200 as described with respect to FIG. 2 hereinabove.

At step 402, as shown in FIG. 4, the 3D video encoder 200 receives video content. The 3D video encoder 200 may receive the video content from, for instance, broadcast programs, Internet Protocol TV (IPTV), switched video (SDV), video on demand (VOD) or other video sources. The video content may include a base view and a non base view.

At step 404, the first encoder 202 encodes the base view to form a first independently compressed video stream 132a associated with the video content. At step 406, the second encoder 204 may concurrently encode the nonbase view to form a second independently compressed video stream 132b. The first and second independently compressed video streams 132a-b may be compressed in a common compression format or alternately, in different compression formats.

At step 408, the descriptor processor 208 generates a descriptor 209 containing information to combine the base and nonbase views to form the 3D video 222. For instance, the descriptor processor 208, as shown with respect to FIG. 2 hereinabove, may generate a 3D rendering information descriptor containing information as shown in Table 1 hereinabove.

At step 410, the multiplexer 206 multiplexes the first and second independently compressed video streams 132a-b to form a transport stream 131. The transport stream 131 is operable to be processed to render a 3D video using the base and nonbase views. The multiplexer 206 may include the descriptor 209 received from the descriptor processor 208 in the transport stream 131. Alternately, the multiplexer 206 may be configured to add the descriptor 209. The transport stream 131 may thereafter be output over a network to subscribers, for instance as shown in FIG. 1.

Turning now to FIG. 5, there is shown a method 600 of rendering a transport stream 131 into 3D video 222. The method 500 may be performed by the STB 120c as described with respect to FIG. 3 hereinabove.

At step 502, as shown in FIG. 5, the STB 120 receives the transport stream 131 at the input/output module 210. The input/output module 131 of the 3D video decoder 130 is configured to receive the transport stream 131 and to send the transport stream 131 to the decoding module 214. The transport stream 131 includes first and second independently compressed video streams 132a-b.

At step 504, the decoding module 214 decodes the first and second independently compressed video streams 132a-b to form a base view and a nonbase view. The base view and the nonbase view are included in a same program. The decoding module 214 then sends the base view and the nonbase view to the 3D combining module 220. The decoding module 214 also sends a descriptor 209 to the 3D combining module 220.

At step 506, the 3D combining module 220 uses the base view and the nonbase view to form 3D video 222. The descriptor 209 indicates to the 3D combining module 220 of orientations of the base and nonbase views, and of upsample rules applicable to make a resolution of the base view equal to a resolution of the nonbase view. The 3D video 222 may thereafter be output to the 3D-ready TV 122, for instance over an HDMI Interface.

Turning now to FIG. 6, there is shown a method 600 of rendering a transport stream 131 into 3D video 222. The method 600 comprises an application of the method 500 to a transport stream 131 in which the base view and the nonbase view are compressed in a common compression format.

At step 602, as shown in FIG. 6, the STB 120 receives the transport stream 131 at the input/output module 210. The input/output module 131 of the 3D video decoder 130 is configured to receive the transport stream 131 and, after demultiplexing in some instances, to send the first and second independently compressed video streams 132a-b to the decoding module 214.

At step 604, the decoding module 214 decodes the first and second independently compressed video streams 132a-b to form a base view and a nonbase view. The base view and the nonbase view are independently compressed and included in a same broadcast program. The decoding module 214 then sends the basic stream to the 3D combining module 220.

At step 606, the decoding module 214 determines 3D video rendering information from a descriptor 209, for instance as described hereinabove with respect to FIG. 2. The descriptor 209 provides values and information that may be used to render 3D video using the base view and the nonbase view.

According to an embodiment, the video based information includes an SEI message provided at a picture or slice level. The SEI includes an orientation of the base view, an orientation of the nonbase view, and an upsample rule The upsample rule is applicable to make a resolution of the base view equal to a resolution of the nonbase view.

At step 608, the 3D combining module 220 renders the 3D video using the base view, the nonbase and the 3D rendering information included in the descriptor 209. The 3D video may thereafter be output to the 3D-ready TV 122.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

Figure 7:
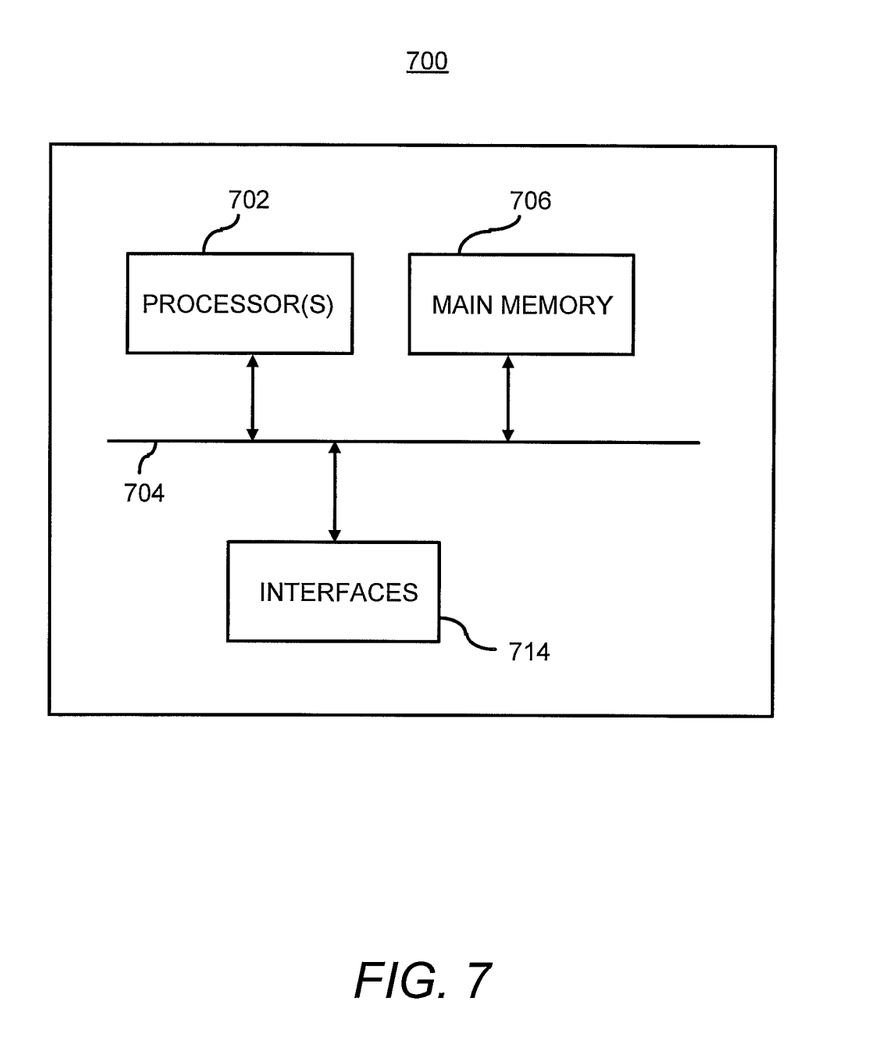
FIG. 7 shows a block diagram of a computer system that may be used in the 3D video decoder, according to an embodiment of the invention.

FIG. 7 illustrates a block diagram of a computing apparatus 700 to implement or execute one or more of the processes depicted in FIGS. 1-6, according to an embodiment. It should be understood that the illustration of the computing apparatus 700 is a generalized illustration and that the computing apparatus 700 may include additional components and that some of the components described may be removed and/or modified without departing from a scope of the computing apparatus 700. According to an embodiment, the computing apparatus 700 comprises the 3D video encoder 200 depicted in FIG. 2. According to another embodiment, the computing apparatus 700 comprises the STB 120c depicted in FIG. 3.

The computing apparatus 700 includes a processor 702 that may implement or execute some or all of the steps described in one or more of the processes depicted in FIGS. 4-6. Commands and data from the processor 702 are communicated over a communication bus 704. The computing apparatus 700 also includes a main memory 706, such as a random access memory (RAM), where the program code for the processor 702, may be executed during runtime and a hard disk (not shown) where a copy of the program code for one or more of the processes depicted in FIGS. 4-6 may be stored. Alternately, the computing apparatus 700 may include non-volatile memory. In addition, the computing apparatus 700 includes interfaces 714 such as coaxial cable, HDMI, USB or other network interfaces.

Embodiments of the present invention provide a way of rendering a transport stream into a 3D video. The method and system herein disclosed allow simulcast of video components providing potential benefits over multi-view coding (MVC). In MVC, the resolution of both views in a 3D transmission must be kept the same. Existing MPEG-4 or MPEG-2 decoders are capable of decoding two videos compressed using MPEG-4 or MPEG-2 and presenting the decoded stereo views for the 3D display. The nonbase view that is used to create the depth perception can potentially have a lower visual quality than the base view without significantly impacting the perceptual quality of the 3D video. This can be achieved by lowering the bit rate corresponding to that the nonbase view and/or lowering the resolution of the nonbase view. The nonbase can also be compressed with a different video standard than the first view, e.g. compress one of the views using MPEG-2, which can be decoded by a large number of deployed decoders, and compress the nonbase using MPEG-4. Additionally, the method and system provide cross standard and backward compatibility in systems using decoders with heterogeneous compressions standards, for instance a mixture of MPEG-2 and MPEG-4 decoders.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are meant in their broadest reasonable sense unless otherwise indicated.

What is claimed is:

1. A three dimensional (3D) video encoder comprising:
a first encoder configured to encode a base view to form a first independently compressed video stream associated with video content;
a second encoder configured to encode a nonbase view to form a second independently compressed video stream associated with the video content;
a descriptor processor configured to generate a descriptor associated with at least one of the first independently compressed video stream and the second independently compressed video stream, wherein
the descriptor includes first information for use in combining a frame from the base view and a frame from the nonbase view in a same video sequence to render a 3D video, and
the descriptor includes second information corresponding to one of a picture level and slice level, the second information indicating at least one of an orientation of the base view, an orientation of the nonbase view, and an upsample rule, the second information being associated with a supplemental enhancement information message in which values represent picture size, base view picture size, Sample Aspect Ratio, number of legs in the re-sampling poly-phase filter in horizontal and vertical direction and number of filter coefficients; and
a multiplexer configured to multiplex the first independently compressed video stream and the second independently compressed video stream and the descriptor to form a transport stream including the descriptor, the base view and the nonbase view.

2. The 3D video encoder of claim 1, wherein the first independently compressed video stream and the second independently compressed video stream are encoded under a common compression format and assigned different stream types, and wherein the common compression format is one of an MPEG-4 and an MPEG-2 format, and wherein the descriptor contains information for use in rendering at least two fields in a common video sequence, wherein the at least two fields are rendered from both the first independently compressed video stream and the second independently compressed video stream.

3. The 3D video encoder of claim 1, wherein the second information is applicable to make a resolution of the base view equal to a resolution of the nonbase view.

4. The 3D video encoder of claim 1, wherein the first independently compressed video stream is operable to be processed by a 2D decoder to form a full resolution 2D compatible stream, and wherein the 2D decoder is operable to drop the second compressed video stream.

5. The 3D video encoder of claim 1, wherein
a first predetermined value indicates that a picture size in the nonbase view is the same as a picture size in the base view;
Lh, wherein Lh is the number of legs in a re-sampling poly-phase filter in a horizontal direction, and wherein,
a value of '0' indicates that horizontal re-sampling is not required,
a value of '1' indicates that horizontal lines are to be repeated for upsampling,
a value greater than or equal to 2 indicates that coefficients (i,j) of the re-sampling poly-phase filter are to set to, for i=0 to Lh−1, j=0 to N−1, wherein N is a number of coefficients in each of the poly-phase legs; and
Lv, wherein Lv is the number of legs in the re-sampling poly-phase filter in a vertical direction, and wherein
a value of '0' indicates that vertical re-sampling is not required,
a value of '1' indicates that vertical lines are to be repeated for upsampling,
a value greater than or equal to 2 indicates that coefficients (i,j) of the re-sampling poly-phase filter are to be set, for i=0 to Lv−1, j=0 to M−1, wherein M is a number of coefficients in each of the poly-phase legs.

6. The 3D video encoder of claim 1, wherein the second information is at the picture level in which values represent one or more of:
user-data type code set to a 4-byte value signaled by a registration descriptor;
Length data;
a value of '0' indicates the picture size is the same for the base and nonbase views;
Lh, wherein Lh is the number of legs in a re-sampling poly-phase filter in a horizontal direction, and wherein,
a value of '0' indicates that horizontal re-sampling is not required,
a value of '1' indicates that horizontal lines are to be repeated for upsampling,
a value greater than or equal to 2 indicates that coefficients (i,j) of the re-sampling poly-phase filter are set to, for i=0 to Lh−1, j=0 to N−1, wherein N is a number of coefficients in each of the poly-phase legs; and
Lv, wherein Lv is the number of legs in the re-sampling poly-phase filter in a vertical direction and wherein,
a value of '0' indicates that vertical re-sampling is not required,
a value of '1' indicates that vertical lines are to be repeated for upsampling,
a value greater than or equal to 2 indicates that coefficients (i,j) of the re-sampling poly-phase filter are set to, for i=0 to Lv−1, j=0 to M−1, wherein M is the number of coefficients in each of the poly-phase legs.

7. A 3D video decoder comprising:
an input module configured to receive a transport stream including a first independently compressed video stream and a second independently compressed video stream and a descriptor associated with video content, the descriptor including
first information for use in combining a frame from the base view and a frame from the nonbase view in a same video sequence to render a 3D video, and
second information corresponding to one of a picture level and slice level, the second information indicating at least one of an orientation of the base view, an orientation of the nonbase view, and an upsample rule, the second information being associated with a supplemental enhancement information message in which values represent picture size, base view picture size, Sample Aspect Ratio, number of legs in the re-sampling poly-phase filter in horizontal and vertical direction and number of filter coefficients;
a decoding module configured to decode the transport stream to form base and nonbase views respectively from the first independently compressed video stream and the second independently compressed video stream; and
a 3D combining module configured to render the 3D video using the first information and the base and nonbase views.

8. The 3D video decoder of claim 7, wherein
the first independently compressed video stream and the second independently compressed video stream are separately coded in a common compression format and assigned different stream types.

9. The 3D video decoder of claim 7, wherein
the first independently compressed video stream and the second independently compressed video stream are respectively coded in first and second compression formats that are different from each other.

10. A receiver comprising:
a processor configured to receive a transport stream including a first independently compressed video stream and a second independently compressed video stream associated with video content, wherein the transport stream includes a descriptor operable by the processor to render a 3D video, the descriptor having syntax including,
a descriptor tag identifying the descriptor;
a descriptor length; and
instructions for rendering the 3D video, the instructions for rendering the 3D video including:
first information for use in combining a frame from the base view and a frame from the nonbase view in a same video sequence to render the 3D video, and
second information corresponding to one of a picture level and slice level, the second information indicating at least one of an orientation of the base view, an orientation of the nonbase view, and an upsample rule, the second information being associated with a supplemental enhancement information message in which values represent picture size, base view picture size, Sample Aspect Ratio, number of legs in the re-sampling poly-phase filter in horizontal and vertical direction and number of filter coefficients; and
processing instructions based on a number of views that are in the transport stream.

11. A method of encoding a transport stream, the method comprising:
receiving video content;
encoding a base view to form a first independently compressed video stream associated with the video content;
encoding a nonbase view to form a second independently compressed video stream associated with the video content; and
generating a descriptor associated with at least one of the first independently compressed video stream and the second independently compressed video stream, wherein
the descriptor includes first information for use in combining a frame from the base view and a frame from the nonbase view in a same video sequence to render a 3D video, and
the descriptor includes second information corresponding to one of a picture level and slice level, the second information indicating at least one of an orientation of the base view, an orientation of the nonbase view, and an upsample rule, the second information being associated with a supplemental enhancement information message in which values represent picture size, base view picture size, Sample Aspect Ratio, number of legs in the re-sampling poly-phase filter in horizontal and vertical direction and number of filter coefficients; and
multiplexing the first independently compressed video stream and the second independently compressed video stream and the descriptor to form a transport stream including the descriptor, the base and nonbase views.

12. The method of claim 11, wherein encoding the base view to form the first independently compressed video stream, and encoding the nonbase view to form the second independently compressed video stream, further comprises:
separately coding the first independently compressed video stream and the second independently compressed video stream in a common compression format and assigning different stream types to the first independently compressed video stream and the second independently compressed video stream.

13. The method of claim 11, wherein encoding the base view to form the first independently compressed video stream associated with the video content, and encoding the nonbase view to form the second independently compressed video stream associated with the video content further comprises:
respectively coding the first independently compressed video stream and the second independently compressed video stream in first and second compression formats that are different from each other.

14. The method of claim 11, wherein including the descriptor and the transport stream further comprises:
including an SEI message providing user-data information at a picture level or slice level in which values represent
a first predetermined value indicates that a picture size in the nonbase view is the same as a picture size in the base view;
Lh, wherein Lh is the number of legs in a re-sampling poly-phase filter in a horizontal direction, and wherein
a value of '0' indicates that horizontal re-sampling is not required,
a value of '1' indicates that horizontal lines are to be repeated for upsampling,
a value greater than or equal to 2 indicates that coefficients (i,j) of the re-sampling poly-phase filter are to set to, for i=0 to Lh−1, j=0 to N−1, wherein N is a number of coefficients in each of the poly-phase legs; and
Lv, wherein Lv is the number of legs in the re-sampling poly-phase filter in a vertical direction, and wherein
a value of '0' indicates that vertical re-sampling is not required, a value of '1' indicates that vertical lines are to be repeated for upsampling, a value greater than or equal to 2 indicates that coefficients (i,j) of the re-sampling poly-phase filter are to be set, for i=0 to Lv−1, j=0 to M−1, wherein M is a number of coefficients in each of the poly-phase legs.

15. The method of claim 11, wherein including the descriptor in the transport stream further comprises:
including a user-data element providing information at a picture level in which values represent one or more of:
user-data type code set to a 4-byte value signaled by a registration descriptor;
Length data;
a value of '0' indicates the picture size is the same for the base and nonbase views;
Lh, wherein Lh is the number of legs in a re-sampling poly-phase filter in a horizontal direction, and wherein,
a value of '0' indicates that horizontal re-sampling is not required,
a value of '1' indicates that horizontal lines are to be repeated for upsampling,
a value greater than or equal to 2 indicates that coefficients (i,j) of the re-sampling poly-phase filter are set to, for i=0 to Lh−1, j=0 to N−1, wherein N is a number of coefficients in each of the poly-phase legs; and
Lv, wherein Lv is the number of legs in the re-sampling poly-phase filter in the vertical direction and wherein
a value of '0' indicates that vertical re-sampling is not required,
a value of '1' indicates that vertical lines are to be repeated for upsampling,
a value greater than or equal to 2 indicates that coefficients (i,j) of the re-sampling poly-phase filter are set to, for i=0 to Lv−1, j=0 to M−1, wherein M is the number of coefficients in each of the poly-phase legs.

16. The method of claim 11, wherein the first independently compressed video stream and the second independently compressed video stream are separately coded in first and second compression formats that are different from each other.

17. A method of rendering a transport stream into 3D video, the method comprising:
receiving the transport stream including a first independently compressed video stream and a second independently compressed video stream and a descriptor, the descriptor including:
first information for use in combining a frame from the base view and a frame from the nonbase view in a same video sequence to render a 3D video, and
second information corresponding to one of a picture level and slice level, the second information indicating at least one of an orientation of the base view, an orientation of the nonbase view, and an upsample rule, the second information being associated with a supplemental enhancement information message in which values represent picture size, base view picture size, Sample Aspect Ratio, number of legs in the re-sampling poly-phase filter in horizontal and vertical direction and number of filter coefficients;
decoding the transport stream to form base and nonbase views that are respectively formed from the first independently compressed video stream and the second independently compressed video stream; and
rendering the 3D video using the first information and the base and nonbase views.

18. The method of claim 17, wherein receiving the transport stream further comprises:
receiving the first independently compressed video stream and the second independently compressed video stream separately coded in a common compression format, the first independently compressed video stream and the second independently compressed video stream being assigned different stream types.

19. The method of claim 17, wherein receiving the transport stream further comprises:
receiving the first independently compressed video stream and the second independently compressed video stream separately coded in first and second compression formats that are different from each other.

20. A nontransitory computer readable storage medium storing at least one computer program that when executed performs a method of rendering a transport stream into 3D video, the method comprising:
receiving the transport stream including a descriptor, first independently compressed video stream and the second independently compressed video stream that are included in a same broadcast program in the transport stream, the descriptor including:
first information for use in combining a frame from the base view and a frame from the nonbase view in a same video sequence to render a 3D video, and
second information corresponding to one of a picture level and slice level, the second information indicating at least one of an orientation of the base view, an orientation of the nonbase view, and an upsample rule, the second information being associated with a supplemental enhancement information message in which values represent picture size, base view picture size, Sample Aspect Ratio, number of legs in the re-sampling poly-phase filter in horizontal and vertical direction and number of filter coefficients;
decoding the transport stream to form base and nonbase views that are respectively formed from the first and second independently compressed video streams associated with the video content; and
rendering the 3D video using the descriptor, the base and nonbase views.

21. A nontransitory computer readable storage medium storing at least one computer program that when executed performs a method of encoding a transport stream, the method comprising:
encoding a base view to form a first independently compressed video stream associated with video content;
encoding a nonbase view to form a second independently compressed video stream associated with the video content;
generating a descriptor, the descriptor including:
first information for use in combining a frame from the base view and a frame from the nonbase view in a same video sequence to render a 3D video, and
second information corresponding to one of a picture level and slice level, the second information indicating at least one of an orientation of the base view, an orientation of the nonbase view, and an upsample rule, the second information being associated with a supplemental enhancement information message in which values represent picture size, base view picture size, Sample Aspect Ratio, number of legs in the re-sampling poly-phase filter in horizontal and vertical direction and number of filter coefficients; and multiplexing the descriptor, the first independently compressed video stream and the second independently compressed video stream to form a transport stream including the descriptor, the base and nonbase views.

\* \* \* \* \*